B. H. PENN.
CLUTCH.
APPLICATION FILED OCT. 8, 1910.
1,007,139.
Patented Oct. 31, 1911.
2 SHEETS—SHEET 1.
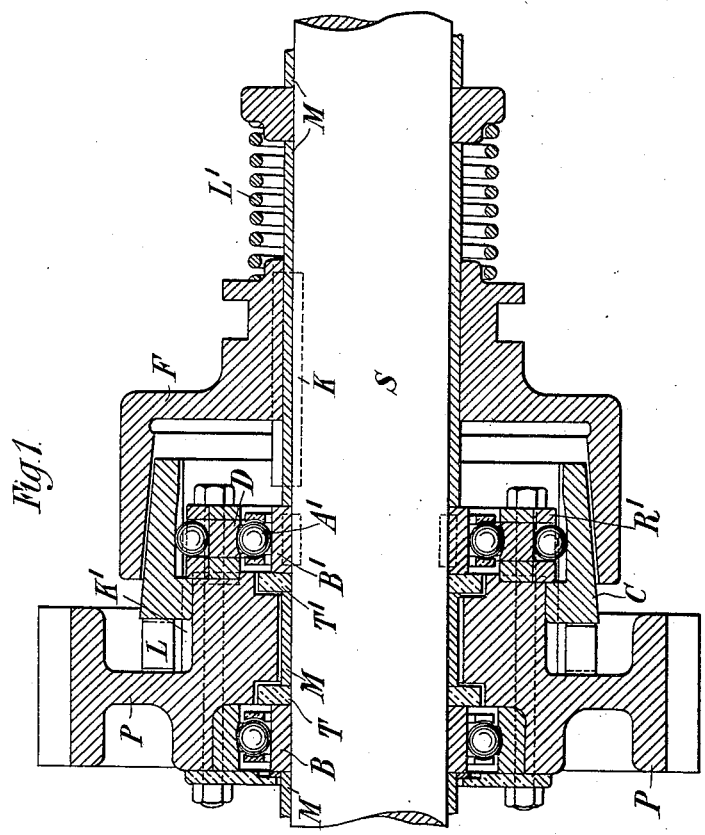
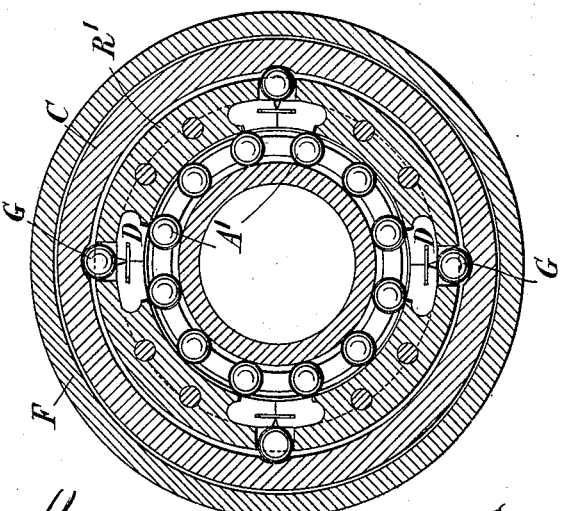

B. H. PENN.
CLUTCH.
APPLICATION FILED OCT. 8, 1910.
1,007,139.
Patented Oct. 31, 1911.
2 SHEETS—SHEET 2.
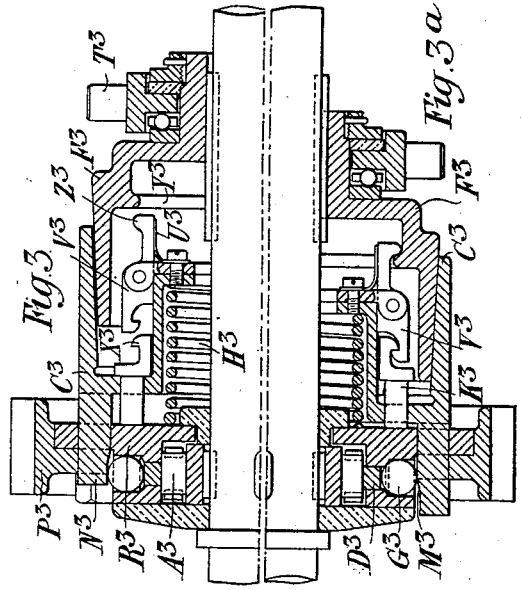
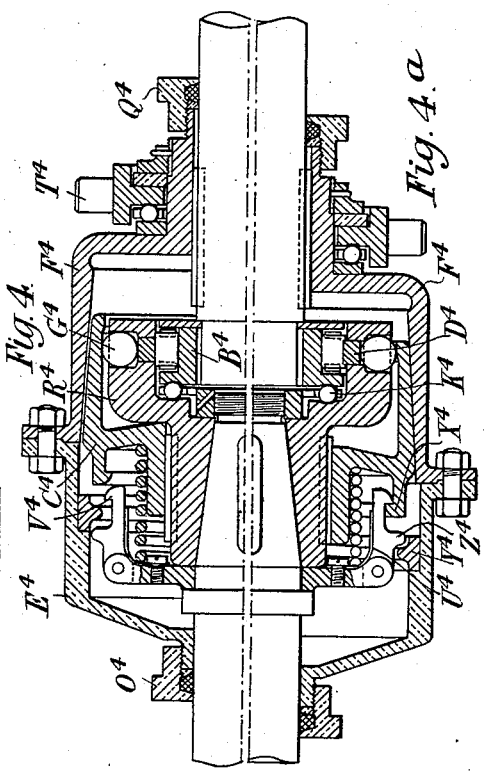
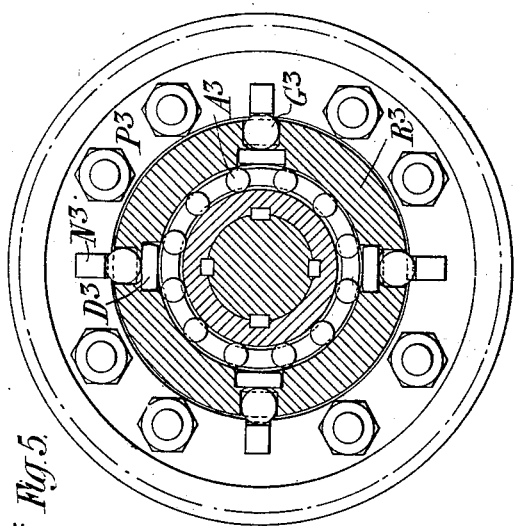
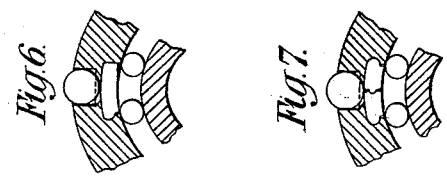
Witnesses:
Clussa Franck
Edw D. Dubois
Inventor
Bertram Harley Penn
by
his Attorney

UNITED STATES PATENT OFFICE.

BERTRAM H. PENN, OF LONDON, ENGLAND.

CLUTCH.

1,007,139.  Specification of Letters Patent.  Patented Oct. 31, 1911.

Application filed October 8, 1910. Serial No. 585,922.

*To all whom it may concern:*

Be it known that I, BERTRAM HARLEY PENN, a subject of His Majesty the King of Great Britain, residing at 3 Flanders road, Bedfork Park, London, England, engineer, have invented a certain new and useful Improvement in Clutches; and I do hereby declare the following to be a full, clear, and exact description of the invention, such as will enable others skilled in the art to which it appertains to make and use the same.

Many forms of clutches have hitherto been devised to transmit power from one shaft to another, or from a shaft to a pulley, spur wheel or the like. The operation of such clutches depends upon pressure exerted by springs or otherwise to keep two or more surfaces in close contact, whereby the friction set up causes those surfaces to move or rotate together and thereby to transmit power or motion from one to the other, but if the power should be for a period in excess of the friction, the surfaces slip, whence the full power is not transmitted, or the clutch has to be made excessively large to render it capable of transmitting the maximum power to which it may be put.

The above disadvantages are overcome in part by a known form of clutch consisting of balls or rollers which may be wedged between a friction ring and inclined surfaces and actuated by an axially-moving inclined sleeve which presses inclined blocks forming the wedging surfaces, radially outward but this form can only be operated in one direction and requires pressure to be continually exerted to keep the clutch engaged and further, if the parts are in motion the load can only be taken up suddenly or with a jerk. These disadvantages are overcome by my invention which I will now proceed to describe.

In the drawings Figure 1 is a sectional elevation and Fig. 2 a cross section of a clutch according to my invention as applied to the transmission of power from a revolving shaft to a spur pinion or the reverse; Fig. 3 is a sectional elevation of a modified form of clutch wherein catches are employed to hold the clutch members engaged, the catches in this figure being shown as disengaged; Fig. 3ª is a similar view showing the catches as being engaged; Fig. 4 is a sectional elevation of a further modified form showing the catches disengaged; Fig. 4ª is a similar view showing the catches engaged; Fig. 5 is a vertical sectional view of a clutch illustrating a modified form of pawl; and Figs. 6 and 7 are fragmentary detail views of further modified forms of pawls.

Referring to Figs. 1 and 2, S is a shaft, and P a pinion or spur wheel, set upon ball bearings as shown at A and $A^1$ the bearing at A being of the usual form with the balls contained in a cage or otherwise and provided with hardened steel bushes or races B and R, secured respectively to the shaft and pinion. When the clutch is disengaged that bearing at $A^1$ also acts as an ordinary ball bearing as shown in the drawing. The bush or race $B^1$ is keyed to the shaft and the outer bush or ball race member $R^1$ is keyed or otherwise secured to the pinion or the like and provided with necessary mechanism for the clutch as follows:—Shaped pieces of hardened steel which may be described as pawls, shown at D are inserted in similarly shaped recesses in the member $R^1$. The pawls are provided at one end with the semicircular portions shown which fit into corresponding portions of the recesses of the member $R^1$ to act as hinges. At the opposite end of the pawls a slot is provided in which a flat or suitably shaped piece of spring steel is inserted, one to each pair of pawls, tending to press the latter outward or away from the shaft. Opposite each pair of pawls a hole is provided in the member $R^1$ and balls G inserted, portions of which project beyond the outer periphery of the member $R^1$ when the pawls are in their normal position as shown by the drawing. An annular cone member C is keyed to the pinion or the like at $K^1$ and is pressed in a direction away from the pinion by laminated or other suitable form of springs shown at L and may be provided on its inner surface with grooves, a portion of which are inclined and which receive the projecting portions of the balls G.

F is the female member of the cone clutch and is keyed to the shaft at K.

T and $T^1$ are bushes to take the thrust during the action of engaging and disengaging the clutch.

M are pieces of tube threaded upon the shaft to keep the various parts in their respective positions.

The operation of the clutch is as follows:—The spring $L^1$ when released presses the member F toward the member C when on engagement the two members move together toward the pinion or the like, depressing the springs L which exert a pressure on the member C but are not as strong as the spring $L^1$. This engagement of the members C and F caused by the opposite pressures of the springs L and the spring $L^1$ sets up friction between the said members sufficient to take up part of the load or power to be transmitted. The continued movement of the members C and F causes the tapered portion of the grooves to depress the balls G and consequently the pawls D are depressed inward or toward the shaft thereby contracting the passage for the balls $A^1$ and causing those which are nearest the pawls and moving toward them to wedge between them and the bush $B^1$, when, the ball race member $R^1$, and consequently the pinion or the like revolve with the shaft and the full power is transmitted. When the member C is pressed home, the above mentioned tapered or inclined portion of the grooves passes beyond the balls G and the latter are retained in their engaged position by the further parallel or horizontal portion of the said grooves thus relieving pressure on the actuator due to the pressure of the balls G acting upon the said tapered or inclined portion of the grooves.

Many modifications of the arrangement described above may be employed, for example Fig. 3 shows in sectional elevation a form in which rollers $A^3$ are substituted for the balls $G^1$, Figs. 1 and 2 and the secondary ball bearing shown at A is rendered unnecessary.

Referring to Fig. 3 the race member $R^3$ contains the pawl mechanism but is also shaped to form a disk, to which the pinion, spur wheel, pulley or the like may be bolted or otherwise secured. The member $C^3$ is provided with projections or prongs $N^3$ which pass through holes provided in the disk portion of the member $R^3$, a certain portion of the inner surfaces of the prongs being inclined as shown at $M^3$ to act on the balls $G^3$ and consequently the pawls as previously described. Screws $K^3$ or other similar arrangement may be provided to limit the movement of the member $C^3$. The action of this form of the device is as follows:—The actuator $T^3$ which may be provided with a ball thrust as shown, is moved along the shaft with the male member $F^3$, which may if preferable be the female member, in a direction toward the pinion or the like, when the members $C^3$ and $F^3$ by reason of the pressure of the spring $H^3$, engage, and take up part of the load or power to be transmitted until the inclined surfaces $M^3$ on the prongs $N^3$ depress the balls $G^3$ and consequently the pawls $D^3$ whence as described in the previous case above, the clutch is fully engaged and the pinion or the like is locked on the shaft. To relieve the actuator $T^3$ of pressure when the clutch is engaged catches or hooks shown at $V^3$ may be provided which engage with catches $X^3$ when the clutch is fully engaged, as shown by Fig. $3^a$. To release these catches, a backward movement of the actuator causes the cam $Y^3$ on the inner surface of the member $F^3$ to engage the cam $Z^3$ on the end of the catch $V^3$, thus to release the hooks and consequently the member $C^3$ and to allow the clutch to disengage. Springs $U^3$ may be provided to keep the catches in their normal positions.

A modified form of the clutch which may be employed to connect two shafts placed end to end is shown in sectional elevation by Figs. 4 and $4^a$ in which case the race member $R^4$ is keyed to the one shaft and the race or bush $B^4$ keyed to the other. The member $C^4$ being keyed to the member $R^4$, and similarly to the member C shown in Figs. 1 and 2 a certain portion of the inner surface of the member $C^4$ is inclined to depress the balls $G^4$ though as shown by Fig. 4 the grooves shown on the inner surface of the member C Figs. 1 and 2 may be dispensed with. A ball thrust bearing may be provided at $K^4$. In conjunction with this form of the clutch a means is shown for the whole of the mechanism to work in oil, by reason of an extension $E^4$ of the member $F^4$ to which the said extension is bolted as shown, and the provision of packing glands $O^4$, and $Q^4$ the whole forming an oiltight case. Also similarly to the form of the clutch shown by Fig. 3 catches $V^4$ kept in position by springs $U^4$ may be provided to take the pressure off the actuator $T^4$ when the clutch is fully engaged as shown by Fig. $4^a$. To release the catches a backward movement of the actuator $T^4$ causes the cam $Y^4$ which may be a hardened steel ring supported by or contained in the oil-tight extension $E^4$, to engage with the cam $Z^4$ on the catches $V^4$ thus releasing the catches and consequently the clutch.

Many variations from the details of this clutch may be made while retaining the principle and without departing from the spirit of the invention, for example the pawls may take any of the forms shown in Figs. 1 and 2 or Figs. 5, 6, or 7. In the latter three cases the springs inserted in the pawls shown in Fig. 2 may be dispensed with, the action of the balls or rollers, or centrifugal force being sufficient to keep the said pawls in position. As further examples, if desirable the cone clutch may be dispensed with and the actuator fitted to the member C, $C^3$ or $C^4$. Also the inclined portions to act on the balls G, $G^3$ and $G^4$ may be arranged to act directly upon the pawls without the intervention of the said balls.

This clutch may be employed for any suitable use other than that described above and shown by the drawings.

What I claim and desire to secure by Letters Patent of the United States is:—

1. In a clutch, the combination of a driving and a driven member, an interposed bearing race, revoluble bearing members movable in said race, wedging members adapted to be projected against certain of the bearing members whereby the driving and driven members move in unison, clutch members for operating said wedging members to wedge said bearing members in the race, and means interposed between said wedging members and said clutch members to receive the pressure exerted by the latter and transmit the same to the wedging members.

2. In a clutch, the combination of a driving and a driven member, an interposed bearing race having recesses formed therein, revoluble bearing members movable in said race, wedging members movably mounted in the recesses in the race, clutch members for projecting said wedging members toward the race to wedge said bearing members therein, and means interposed between said wedging members and said clutch members to receive the pressure exerted by the latter and transmit the same to the wedging members.

3. In a clutch, the combination of a driving and a driven member, an interposed bearing race, revoluble bearing members movable in said race, wedging members adapted to be projected against said bearing members to wedge the latter in the race, a ball arranged in operative relation to each wedging member, and means adapted to act against said ball whereby said wedging members operate to wedge the bearing members in the race.

4. In a clutch, the combination of a driving and a driven member, an interposed bearing race having recesses formed therein, a pawl movably retained in each said recess, revoluble bearing members movable in the race, a ball arranged in operative relation to each of said wedging members, and means for exerting pressure on said ball whereby the corresponding pawl is moved toward the race and operates to wedge the bearing members therein.

5. In a clutch, the combination of a driving and a driven member, an interposed bearing race, revoluble bearing members movable in said race, wedging members adapted to be projected against said bearing members to wedge the same in the race, a ball mounted over each of said wedging members, and axially movable clutch members adapted when moved together to exert pressure on said balls whereby said wedging members operate to wedge the revoluble bearing members in the race.

6. In a clutch, the combination of a driving and a driven member, an interposed bearing race having recesses formed therein, a pawl movably retained in each of said recesses, revoluble bearing members movable in said race, a ball movable in a recess over each of said pawls, and a pair of telescoping clutch members one thereof having its inner surface inclined and adapted when the clutch members are engaged to exert pressure on said balls whereby the pawls are projected against the revoluble bearing members in the race.

7. In a clutch, the combination of a driving and a driven member, an interposed bearing race, revoluble bearing members movable in said race, wedging members adapted to be projected toward the race to wedge the bearing members therein, a ball arranged in operative relation to each of said wedging members, friction clutch members adapted to be moved axially to exert pressure on said balls to project the wedging members toward the race and wedge the bearing members therein, and catches adapted to automatically interlock when the friction clutch members have been engaged.

8. In a clutch, the combination of a driving and a driven member, an interposed bearing race, revoluble bearing members movable in said race, wedging members carried by the race, a ball mounted over each of said wedging members, friction clutch members adapted to be telescoped by axial movement to act against said balls and operate said wedging members to wedge the bearing members in the race, catches adapted to automatically interlock when the friction clutch members have been engaged, and means for releasing said catches upon separation of the driving and driven members.

In testimony whereof I have hereunto set my hand in the presence of two witnesses.

BERTRAM H. PENN.

Witnesses:
G. A. MACKENZIE,
N. M. WARD.